3,586,725
2,4-DIHALO-3,5-DINITROBENZOTRIFLUORIDES
Don L. Hunter, Anaheim, Calif., assignor to United States Borax & Chemical Corporation, Los Angeles, Calif.
No Drawing. Filed June 12, 1969, Ser. No. 832,860
Int. Cl. C07c 79/12
U.S. Cl. 260—646          7 Claims

ABSTRACT OF THE DISCLOSURE 2,4-dihalo-3,5-dinitrobenzotrifluorides in which the halo is bromo or chloro. The compounds are prepared by reaction of 2,4-dihalobenzotrifluoride with a mixture of fuming sulfuric acid and fuming nitric acid at a temperature of below about 90° C. They are useful as intermediates for the preparation of herbicides.

---

This invention relates to novel halonitrobenzotrifluoride compounds and more particularly, to novel 2,4-dihalo-3,5-dinitrobenzotrifluorides and a process for the preparation of the compounds.

According to the present invention there are provided as new compositions the 2,4-dihalo-3,5-dinitrobenzotrifluorides in which the halo substituent in chlorine or bromine. The compounds can be represented by the formula

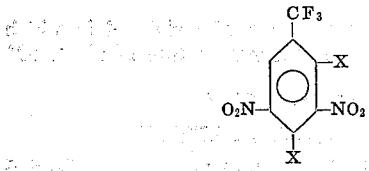

in which X is chlorine or bromine. They are crystalline solids which are useful as intermediates for the preparation of herbicides. The compounds of this invention are also useful as herbicides.

The compounds of this invention can be prepared by reaction of the corresponding 2,4-dihalobenzotrifluoride with a mixture of fuming nitric acid and fuming sulfuric acid (such as about 2:1 to 1:2 by weight) at a temperature below about 90° C., preferably in the range of about 60° to 80° C. It is essential that the reaction take place at a temperature below about 90° C. in order to avoid decomposition of the desired product. It appears that the trifluoromethyl group is decomposed at an appreciable rate at temperatures above about 90° C. The nitric acid is preferably used in excess of stoichiometry.

The following example illustrates preparation of a representative compound of this invention.

EXAMPLE I 2,4-dichloro-3,5-dinitrobenzotrifluoride

Fuming sulfuric acid (600 ml.) containing 30–33% free SO₃ was stirred in a two-liter, three-necked flask immersed in an ice bath. Fuming 90% nitric acid (585 ml.) was added followed by 148.8 grams (0.692 mole) of 2,4-dichlorobenzotrifluoride. This stirred slurry then was heated to 76° C. and held at 76±1° C. for 96 hours. The mixture was cooled and the acid was drained from the crust of crystalline product. Water (1000 ml.) was added to the broken up solid and the stirred slurry extracted with 500 ml. of toluene. The toluene solution, with another 500 ml. of toluene was added, was washed successively with water (500 ml.), twice with 500 ml. of a 5% sodium bicarbonate solution, and finally with water (500 ml.). Removal of the toluene by evaporation at reduced pressure and drying overnight gave 166.6 grams (79%) of the desired 2,4-dichloro-3,5-dinitrobenzotrifluoride, M.P. 67°–72° C. After recrystallization from ethanol the material melts at 74°–75° C.

2,4-dibromo-3,5-dinitrobenzotrifluoride is prepared in a similar manner by reaction of 2,4-dibromobenzotrifluoride in place of 2,4-dichlorobenzotrifluoride.

The compounds of this invention are useful as intermediates in the preparation of N-substituted-2,4-dinitro-6-trifluoromethyl-1,3-phenylenediamine compounds which are valuable herbicides.

The following equation illustrates the conversion of the present compounds to the herbicidal N-substituted-2,4-dinitro-6-trifluoromethyl-1,3-phenylenediamine compounds

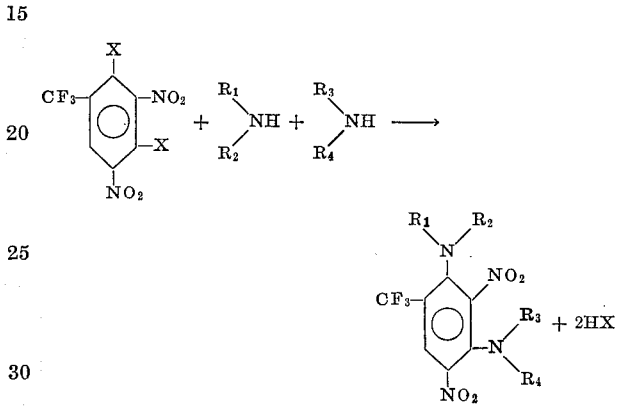

in which X is chlorine or bromine, R₁ is selected from hydrogen, alkyl, alkenyl, alkynyl and aralkyl, R₂ and R₃ are each selected from hydrogen, alkyl, alkenyl and alkynyl, and R₄ is selected from alkyl, alkenyl, alkynyl and aralkyl. The reaction with the amines or ammonia takes place in one or two steps. When R₁ and R₂ are the same as R₃ and R₄, the reaction takes place in one step using at least four moles of amine for each mole of 2,4-dihalo-3,5-dinitrobenzotrifluoride. When R₁ and R₂ are different from R₃ and R₄, the reaction requires two steps in which a different amine is employed in each step. In the first step about two moles of the amine forming the —N< group between the two nitro groups on the ring is reacted with about one mole of the 2,4-dihalo-3,5-dinitrobenzotrifluoride. The first halogen atom replaced is that between the nitro groups on the aromatic ring. This step is advantageously carried out in a nonpolar solvent such as a hydrocarbon in which the amine hydrohalide is insoluble and can thereby be removed by filtration. In the second step about two moles of the amine forming the other —N< group is reacted with the monoamino-substituted compound to form the unsymmetrically substituted 1,3-phenylenediamine compound. The second reaction can take place in a sealed reaction vessel, such as a sealed tube or an autoclave, to avoid losses of amine and provide easy control of the reaction, or at atmospheric pressure in the presence of a solvent such as an alcohol, in which the amine is highly soluble. In the case of higher boiling amines it is not necessary to use a sealed reaction vessel for the reaction but it is sufficient to merely carry it out in the presence of a suitable solvent.

A reaction temperature in the range of from about 20° to about 100° C. preferably is employed to give good yields of the product and a satisfactory rate of reaction, both in the case of using a sealed reaction vessel and when the reactants are brought together in the presence of a solvent. Hydrogen halide is formed as a by-product and, in the presence of excess amine, is converted to the amine hydrohalide which can be readily removed by washing with water or by filtration after dissolution of the product in a suitable solvent.

The following example illustrates the utility of the compounds of the present invention as intermediates for forming the herbicidal 2,4-dinitro-6-trifluoromethyl-1,3-phenylenediamines.

EXAMPLE II

N¹,N¹-dimethylene-N³,N³-di-n-propyl-2,4-dinitro-6-trifluoromethyl-1,3-phenylenediamine A heavy walled glass reaction tube of approximately 50 ml. capacity was charged with 7.0 grams (0.023 mole) of 2,4 - dichloro - 3,5 - dinitrobenzotrifluoride, 4.64 grams (0.0458 mole) of di-n-propylamine and 40 ml. of absolute ethanol. The tube was sealed and heated in an oil bath at 94°–99° C. for 98 hours. The cooled reaction mixture was then evaporated to dryness to give an oily residue which was extracted with boiling diethyl ether. The insoluble di - n - propylamine hydrochloride was removed by filtration and washed with additional ether. The combined ether filtrates were evaporated to give an oily orange residue which was dissolved in 100 ml. of absolute ethanol and decolorized with activated charcoal. The ethanol and volatiles were removed by evaporation under reduced pressure to give N,N-di-n-propyl-3-chloro-2,6-dinitro-4-trifluoromethylaniline (6.77 grams) as a viscous reddish oil. A solution of 4 grams (0.0108 mole) of N,N-di-n-propyl - 3-chloro - 2,6-dinitro-4-trifluoromethylaniline and 0.93 gram (0.0216 mole) of ethyleneimine in 50 ml. of absolute ethanol was stirred overnight at 35° C. The solvent was removed by evaporation under reduced pressure to give a residue which was extracted with boiling hexane. The hexane extract was evaporated to dryness and the residue dissolved in absolute ethanol. After decolorizing with charcoal, the ethanol and volatiles were removed by evaporation under reduced pressure to give the product as a viscous amber oil, which was identified by its proton nuclear magnetic resonance spectrum.

The compounds of this invention are also herbicidal. For example, 2,4-dichloro-3,5-dinitrobenzotrifluoride was applied as a post-emergence treatment at 5 pounds per acre to soybeans, velvetleaf, oats and millet. Twenty-one days after treatment, the plants were evaluated for herbicidal activity and rated on a 0 to 9 scale in which 0=no effect and 9=complete kill. The following results were obtained.

| Plant: | Rating |
|---|---|
| Soybeans | 2 |
| Velvetleaf | 5 |
| Oats | 0 |
| Millet | 6 |

Reference is made to an application of Don L. Hunter, William G. Woods, James D. Stone and Cecil W. LeFevre, Ser. No. 812,307 filed Apr. 1, 1969 which discloses and claims the preparation of the 6-trifluoromethyl-2,4-dinitro - 1,3 - phenylenediamine compounds and their use as herbicides.

Various changes and modifications of the invention can be made and, to the extent that such variations incorporate the spirit of this invention, they are intended to be included within the scope of the appended claims.

What is claimed is:

1. 2,4-dihalo - 3,5-dinitrobenzotrifluoride in which said halo is selected from chlorine and bromine.

2. A compound in accordance with claim 1 in which said halos are chlorine.

3. A compound in accordance with claim 1 in which said halos are bromine.

4. A process for preparation of 2,4-dihalo-3,5-dinitrobenzotrifluoride which comprises reacting 2,4-dihalobenzotrifluoride with a mixture of fuming sulfuric acid and fuming nitric acid at a temperature of below about 90° C.

5. A process according to claim 4 in which said 2,4-dihalo-3,5-dinitrobenzotrifluoride is 2,4-dichloro-3,5-dinitrobenzotrifluoride.

6. A process according to claim 4 in which said 2,4-dihalo-3,5-dinitrobenzotrifluoride is 2,4-dibromo-3,5-dinitrobenzotrifluoride.

7. The process in accordance with claim 4 in which said reaction takes place at a temperature of about 60° to about 80° C.

References Cited

UNITED STATES PATENTS

| 2,257,093 | 9/1941 | Friedrich et al. | 260—646 |

FOREIGN PATENTS

| 745,293 | 2/1933 | France | 260—646 |
| 800,343 | 4/1936 | France | 260—646 |

LELAND A. SEBASTIAN, Primary Examiner

U.S. Cl. X.R.

71—121; 260—577